(12) United States Patent
Xiao et al.

(10) Patent No.: US 12,704,715 B2
(45) Date of Patent: Aug. 11, 2026

(54) OPTICAL ILLUMINATION MODULE FOR A DISPLAY SYSTEM

(71) Applicant: Continental Automotive Technologies GmbH, Hannover (DE)

(72) Inventors: Ting Xiao, Singapore (SG); Christian Junge, Frankfurt am Main (DE)

(73) Assignee: Continental Automotive Technologies GmbH, Hannover (DE)

( * ) Notice: Subject to any disclaimer, the term of this patent is extended or adjusted under 35 U.S.C. 154(b) by 204 days.

(21) Appl. No.: 18/556,811

(22) PCT Filed: Jan. 26, 2022

(86) PCT No.: PCT/EP2022/051660
§ 371 (c)(1),
(2) Date: Oct. 23, 2023

(87) PCT Pub. No.: WO2022/223154
PCT Pub. Date: Oct. 27, 2022

(65) Prior Publication Data

US 2024/0369832 A1 Nov. 7, 2024

(30) Foreign Application Priority Data

Apr. 23, 2021 (GB) ..................................... 2105782

(51) Int. Cl.
*G02B 27/01* (2006.01)
*G09G 3/34* (2006.01)

(52) U.S. Cl.
CPC ....... *G02B 27/0101* (2013.01); *G09G 3/3426* (2013.01); *G09G 2320/066* (2013.01)

(58) Field of Classification Search
CPC G02B 27/0101; G02B 3/0068; G02B 3/0075; G02B 27/286; G02B 19/0066;
(Continued)

(56) References Cited

U.S. PATENT DOCUMENTS 5,828,471 A 10/1998 Davis et al.
2004/0218390 A1 11/2004 Holman et al.
(Continued)

FOREIGN PATENT DOCUMENTS

CN 106094341 11/2016
CN 107257940 10/2017
(Continued)

OTHER PUBLICATIONS

Letter of Reasons for Refusal mailed on Oct. 2, 2024 from corresponding Japanese patent application No. 2023-561086.
(Continued)

*Primary Examiner* — Charles S Chang
(74) *Attorney, Agent, or Firm* — COZEN O'CONNOR

(57) ABSTRACT

An optical illumination module for a motor vehicle display system including a light generator for generating light beams, and a polarizer film to at least partially polarize the light beams generated by the light generator and a reflective sheet positioned therebetween. The reflective sheet comprises a plurality of punch-holes, each of the punch-hole is configured to align to each of the light cell of the light generator. The reflective sheet is operable to receive the at least partially polarized light beams reflected from the polarizer film and re-direct the polarized light beams towards the polarizer film.

15 Claims, 8 Drawing Sheets

(58) Field of Classification Search
CPC ............... G02B 6/0031; G09G 3/3426; G09G 2320/066; G02F 1/133605; G02F 1/133603; G02F 1/133607; G02F 1/13362
See application file for complete search history.

(56) References Cited

U.S. PATENT DOCUMENTS

| | | | | |
|---|---|---|---|---|
| 2005/0185419 | A1* | 8/2005 | Holman | G02B 6/0055 362/555 |
| 2010/0156955 | A1 | 6/2010 | Kimura | |
| 2010/0165619 | A1 | 7/2010 | Kawato et al. | |
| 2011/0211102 | A1 | 9/2011 | Yamada | |
| 2017/0322415 | A1* | 11/2017 | Irzyk | G02F 1/133536 |
| 2019/0072800 | A1 | 3/2019 | Narushima | |

FOREIGN PATENT DOCUMENTS

| | | | |
|---|---|---|---|
| DE | 202021105028 | U1 | 10/2021 |
| EP | 0720040 | A2 | 7/1996 |
| EP | 1729057 | A1 | 12/2006 |
| EP | 1923364 | A1 | 5/2008 |
| JP | H08234143 | A | 9/1996 |
| JP | 2006520518 | A | 9/2006 |
| JP | 2007045649 | A | 2/2007 |
| JP | 2007200869 | A | 8/2007 |
| JP | 2014202835 | A | 10/2014 |
| WO | 2004068182 | A2 | 8/2004 |
| WO | 2006137459 | A1 | 12/2006 |

OTHER PUBLICATIONS

Search Report by Registered Search Organization dated Sep. 18, 2024 from corresponding Japanese patent application No. 2023-561086.

Notice of Reasons for Refusal mailed Oct. 2, 2024 from corresponding Japanese patent application No. 2023-561086.

Decision of Refusal mailed Mar. 12, 2025 from corresponding Japanese patent application No. 2023-561086.

Great Britain Search Report dated Sep. 30, 2021 for the priority GB Patent Application No. 2105782.3.

The International Search Report and the Written Opinion of the International Searching Authority mailed on Apr. 29, 2022 for the PCT Application No. PCT/EP2022/051660 which this application claims priority.

Logan Cummins, "Local Dimming in Automotive Display", Tech Days, Texas Instruments.

Bin Xie, et al., "Design of a brightness-enhancement-film-adaptive freeform lens to enhance overall performance in direct-lit light-emitting diode backlighting", Jun. 2015Applied Optics 54(17):5542, DOI: 10.1364/AO.54.005542 Project: quantum dots-light-emitting diodes packaging/.

Office Action of corresponding Chinese Patent Application No. 202280029593.7 dated Mar. 31, 2026.

* cited by examiner

OPTICAL ILLUMINATION MODULE FOR A DISPLAY SYSTEM

CROSS-REFERENCE TO RELATED APPLICATIONS

The present application is a National Stage Application under 35 U.S.C. § 371 of International Patent Application No. PCT/EP2022/051660 filed on Jan. 26, 2022, and claims priority from Great Britain Patent Application No. 2105782.3 filed in the United Kingdom Intellectual Property Office, the disclosures of which are herein incorporated by reference in their entireties.

BACKGROUND

1. Field

This disclosure relates to motor vehicles, and more in particular light source modules for motor vehicle displays.

2. Description of Related Art

Increasingly, the automotive industry is moving towards using display technologies for entertainment and for displaying vehicular information. By way of an example is a head-up display (HUD) which project images from an image generating unit onto a mirror, which is in turn reflected onto a windshield or combiner HUD to display vehicular information to a driver. A light source, for example a backlight unit is necessary for displaying content to a viewer. Another example will be HUD systems which does not require mirror. The image to be displayed is simply reflected onto a glass panel. However, in automotive applications, one of the greatest challenges is often excessive ambient lighting or the lack thereof, which affects the quality of image projection. Another challenge is the size of light source for displays used in a motor vehicle, due to space constrains.

Conventionally, a backlight unit for display devices is made up of reflector and diffusers or with a light guide and a foil stack. The issue with conventional backlight unit is that the angular distribution is wide and may not be suitable for motor vehicle applications, where space constrains is a concern. Wide angle distribution of light from backlight module is particularly challenging for head-up display applications and display devices with small viewing angles, which are often used in motor vehicles to counter space constrain problem.

There is therefore a need for an automotive component for a motor vehicle display system that overcomes, or at least ameliorates the issues discussed above.

SUMMARY

A purpose of this disclosure is to improve the homogeneity and brightness of lighting module for HUD and improve the contrast for local dimming effect by adjusting beam angle of light beam reflected from a backlight unit to produce small or narrow beam angle.

The objective of this disclosure is solved by an optical illumination module for a display system comprising: a light generator operable to generate light beams, the light generator comprising a plurality of light cells; a polarizer film operable to at least partially polarize the generated light beams; a reflective sheet comprising a plurality of punch-holes to allow the generated light beams to emit therethrough; and a polarization-rotating element operable to re-direct the generated light beams; characterized in that the reflective sheet is operable to receive the polarized light beams and the re-directed light beams; and re-direct the polarized light beams, the re-directed light beams, and the light beams emitting through the punch-holes towards the polarizer film.

An advantage of the above described aspect of this disclosure yields an optical illumination module with homogeneity of illumination and brightness for displays, in particular HUD systems and compact display devices observed by reflection on a transparent pane. Consequently, clarity of images projected is achieved. Example of suitable transparent pane includes glass or tempered glass for use as windows pane, sunroof pane and/or front and rear of windshield pane.

Preferred is an optical illumination module as described above or as described above as being preferred, in which: the reflective sheet is positioned between the light generator and the polarizer film.

The advantage of the above aspect of this disclosure is to allow light beams polarized from the polarizer film to be reflected back and forth between the reflective sheet, thereby recycling the usage of the light beams generated by the light generator, to yield homogeneity and improved light efficiency.

Preferred is an optical illumination module as described above or as described above as being preferred, in which: the light generator comprises an LED array, a lens array or a combination thereof.

Preferred is an optical illumination module as described above or as described above as being preferred, in which: the lens array is positioned between the reflective sheet and the LED array.

Preferred is an optical illumination module as described above or as described above as being preferred, in which: the reflective sheet and the lens array are integrated as a single device.

The advantage of the above aspects of this disclosure yields an optical illumination module with homogeneity illumination. An advantage of providing the reflective sheet and the lens array integrated as a single device means individual LED components may replace LED array.

Preferred is an optical illumination module as described above or as described above as being preferred, in which: the reflective sheet has a spherical or an aspherical surface.

Preferred is an optical illumination module as described above or as described above as being preferred, in which: the aspherical surface is a concave or a bow-shaped profile.

The advantage of the above aspects of this disclosure is optimize the controlling or influencing the direction of light beams reflected off the reflective sheet.

Preferred is an optical illumination module as described above or as described above as being preferred, in which: the reflective sheet is a metal punch-sheet; a plastic sheet treated with a reflective coating; or a plastic sheet treated with a reflective foil.

The advantage of the above aspect of this disclosure yields the reflective sheet in precise and efficient manner.

Preferred is an optical illumination module as described above or as described above as being preferred, in which: the polarizer film (110) is a dual brightness enhancement film (DBEF).

The advantage of the above aspects of this disclosure optimizes the polarization of light beams and reflection of polarized light beams to continuously recycle the reflected light beams and at the same time direct the reflected light beams together with light beams generated from the light generator towards the top layer of the optical illumination module, thus achieving homogeneity.

Preferred is an optical illumination module as described above or as described above as being preferred, in which: the polarization rotating element is a retarder or a quarter-wave plate.

Preferred is an optical illumination module as described above or as described above as being preferred, in which: the polarization rotating element is made of high birefringence material.

The advantage of the above aspect of this disclosure increases intensity of light beams by increasing energy.

Preferred is an optical illumination module as described above or as described above as being preferred, in which, the optical illumination module further comprises: an optical diffusor positioned forward of the polarizer film.

Preferred is an optical illumination module as described above or as described above as being preferred, in which: the display system is a motor vehicle display system operable to project a virtual image on a transparent pane.

Preferred is an optical illumination module as described above or as described above as being preferred, in which: the display system is a motor vehicle display system (400) embedded within a display device.

The advantage of the above aspect of this disclosure yields an optical illumination module with homogeneity for use in vehicular display systems.

The objective of this disclosure is solved by a method for providing illumination for a display system, comprising: generating light beams from a light generator, the light generator comprising a plurality of light cells; at least partially polarizing light beams generated from the light generator by way of a polarizer film; changing a direction of the light beams generated by the light generator by way of a polarization-rotating element; receiving, by way of a reflective sheet: the at least partially polarized light beams reflected from the polarizer film; and the light beams re-directed by the polarization rotating element; and re-directing, the at least partially polarized light beams; and the light beams re-directed by the polarization rotating element; and light beams emitting through the light cells towards the polarizer film.

An advantage of the above-described aspect of this disclosure yields a method of illumination which achieves homogeneity, in particular for HUD systems and compact sized display device.

Preferred is a method of optical illumination as described above or as described above as being preferred, further comprising: locally dimming each light cell by controlling the contrast of light generated from each light cell.

The advantage of the above aspect of this disclosure improves performance of local dimming effects by adjusting the contrast of light generated from each light cell.

BRIEF DESCRIPTION OF DRAWINGS

Other objects and aspects of this disclosure will become apparent from the following description of embodiments with reference to the accompanying drawings in which.

In various embodiments described by reference to the above figures, like reference signs refer to like components in several perspective views and/or configurations.

DETAILED DESCRIPTION

The following detailed description is merely exemplary in nature and is not intended to limit the disclosure or the application and uses of the disclosure. Furthermore, there is no intention to be bound by any theory presented in the preceding background of the disclosure or the following detailed description. It is the intent of this disclosure to present an optical illumination module for a display system, in particular HUD systems and compact-size displays.

Hereinafter, the term "transparent" shall refer to a device or apparatus having transparent properties, such that background of the device or apparatus may be observable. A "transparent pane" thus allows a user to see both the image displayed on the display apparatus and the background view behind the display apparatus, i.e. the background behind the transparent pane can be seen through. A suitable example of a "transparent pane" may be a glass or tempered glass.

Figure 1A:
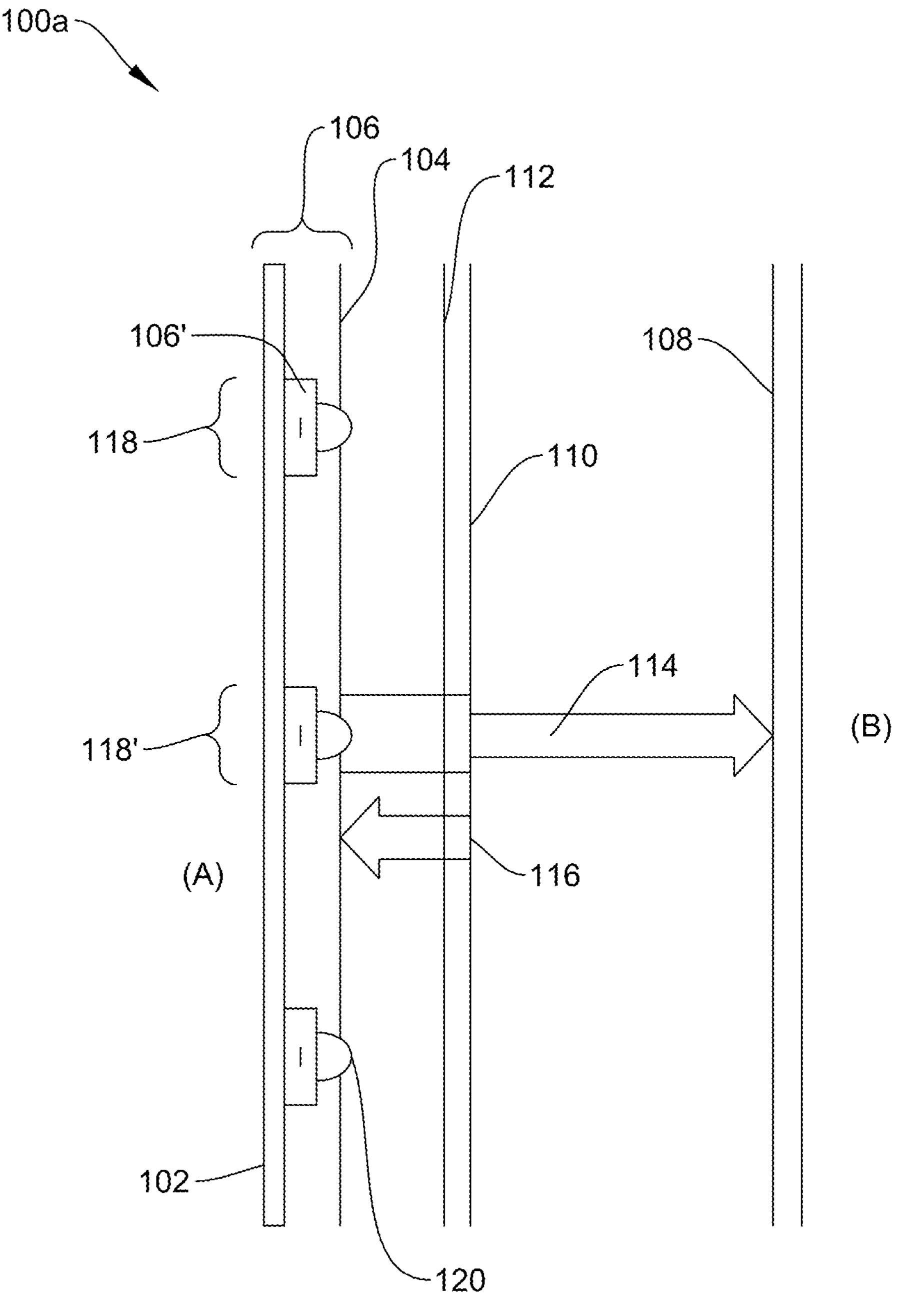
FIG. 1A shows a side view of an optical illumination module in accordance with a preferred embodiment.
Figure 1B:
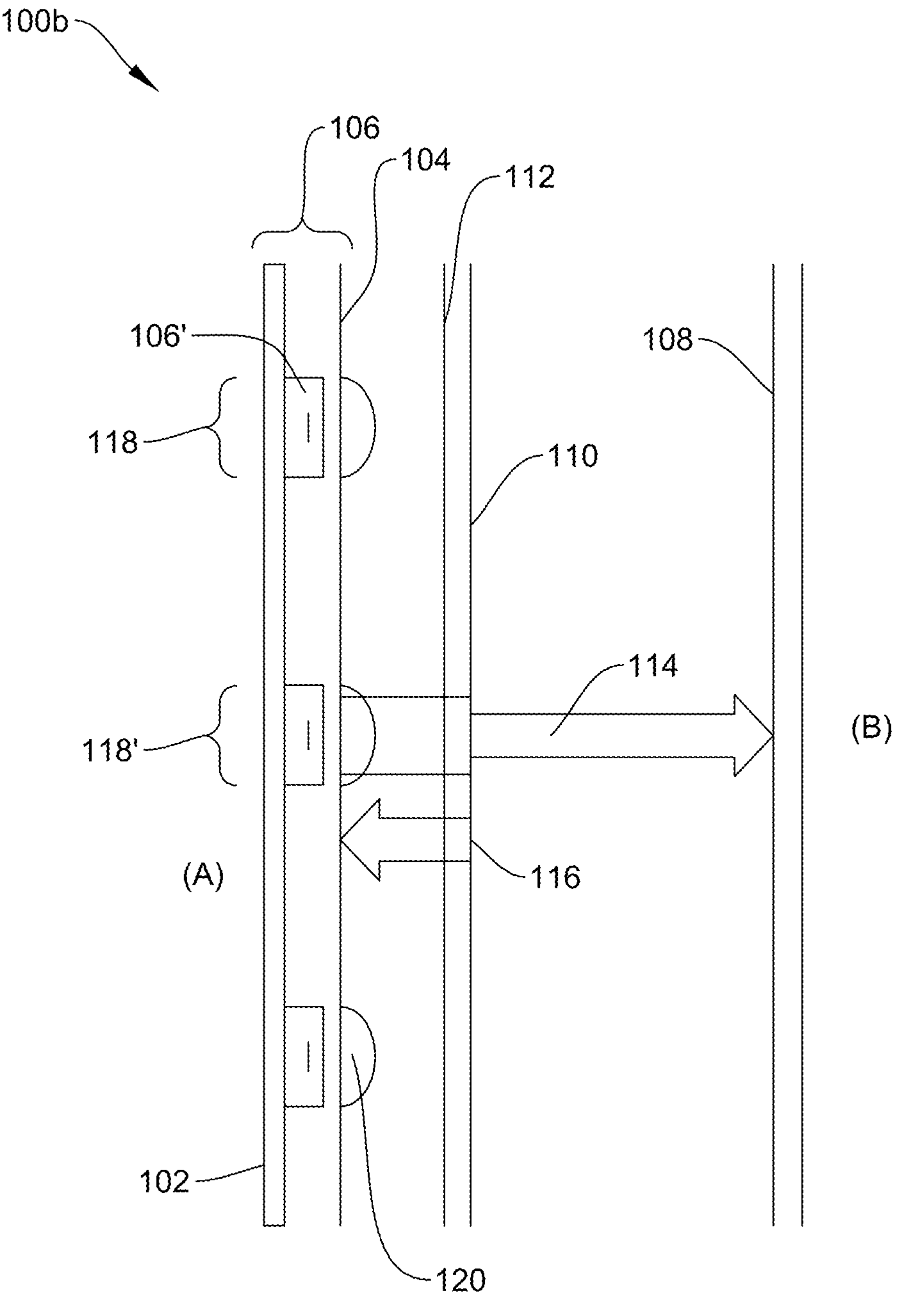
FIG. 1B shows a side view of an optical illumination module in accordance with another preferred embodiment.

Referring now to the accompanying drawings, FIG. 1A and FIG. 1B shows an optical illumination module 100*a* in accordance with a preferred embodiment. The optical illumination module 100*a* includes a light generator 106 for generating light beams. The light generator 106 may further include a plurality of light cells 118, 118'. An example of a light generator 106 may be a light emitting diode (LED) array for emitting light beams and more specifically, multiple LEDs representing each light cell 118, 118' for emitting light beams. The light generator 106 may further include a lens covering each light cell 118, 118' or a lens array 120 position forward of the LED array. The lens array 120 function as a collimator, to increase intensity of light beams generated by the light generator 106. In alternative embodiment, the lens array 120 may be a plurality of individual lens covering each LED, thus forming an array.

The optical illumination module 100*a*, 100*b* includes a polarizer film 110. The polarizer film 110 is operable to at least partially polarize the light beams 116 in a direction (A) as illustrated in FIG. 1A and FIG. 1B. At least partially light beam 114 is to transmit through the polarizer film 110 towards a viewing range (B), such as a display layer 108, as shown in FIG. 1A and FIG. 1B. For clarity, the function of the polarizer film 100 is to reflect light beams 116 towards the direction of (A). A suitable example of the film 110 may be a dual brightness enhancement film (DBEF).

The optical illumination module 100*a* further includes a reflective sheet 104 configured to align to each of the light cell 118, 118' of the light generator 106 to allow light beams to emit through. The reflective sheet 104 is operable to re-direct polarized light beams 116 from the polarizer film 110 transmitting towards the reflective sheet 104 back the polarizer film 110 together with light beams generated from the light generator 106. Due to the continuously reflecting of polarized light beams and re-directing the reflected light beams together with the light beams generating from the light generator 106, the light beams within the optical illumination module 100 is recycled before at least partially transmitting the light beams 114 towards the viewing range (B).

In an embodiment, the reflective sheet 104 is positioned between the lens array 120 and the LED array 106. In another exemplary embodiment as shown in FIG. 1B, the reflective sheet 104' and the lens array 120 is integrated as a single device that may be positioned between the polarizer film 110 and of the light generator 106 to influence the reflection and re-direction of the light beams 116 transmitting between the polarizer film 110, lens array 120 and the light generator 106. Advantageously, both embodiments as shown in FIG. 1A and FIG. 1B achieves homogeneity of illumination through this light beam recycling process caused by the reflective sheet 104.

The optical illumination module 100*b* further include a polarization-rotating element 112 operable to change the polarization of the light beams generated. An example of a polarization-rotating element 112 may be a retarder or a quarter-wave plate. Preferably, the polarization-rotating element 112 is made of high birefringence material, to control re-direction of the light beam polarization.

In another embodiment, an optical diffusor (not shown in the figures) may be included in the polarizer film of the display layer nearer the viewing range (B) for re-directing light beams.

In an exemplary embodiment, the polarizer film 110 is positioned preferably between 3 mm to 5 mm, and more preferably 4.7 mm forward of the reflective sheet.

In another exemplary embodiment, the reflective sheet 104 is positioned between the light generator 106 and the polarizer film 110. Advantageously, the placement of reflective sheet 104 between the light generator 106 and the polarizer film 110 increases homogeneity of illumination through a light beam recycling process within the optical illumination module 100*a*.

In yet another exemplary embodiment as shown in FIG. 1B, the optical illumination system 100*b* shows an integrated reflective sheet 104'. The integrated reflective sheet 104' comprises a spherical or aspherical surface with a plurality of punch sheets, and lens array 120.

Figure 2A:
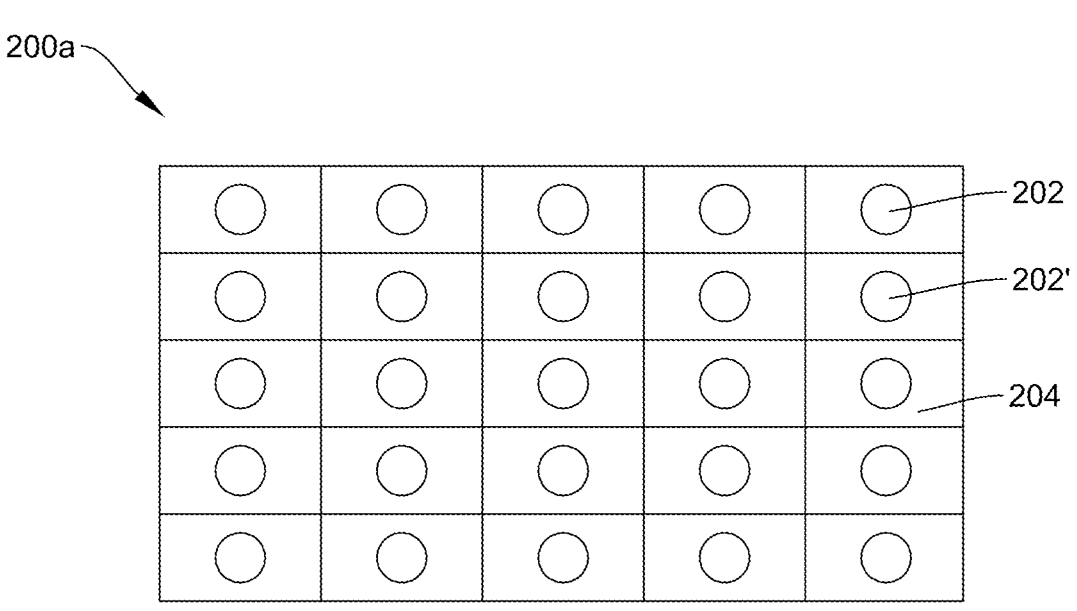
FIG. 2A shows a reflective sheet according to in accordance with a preferred embodiment.
Figure 2B:
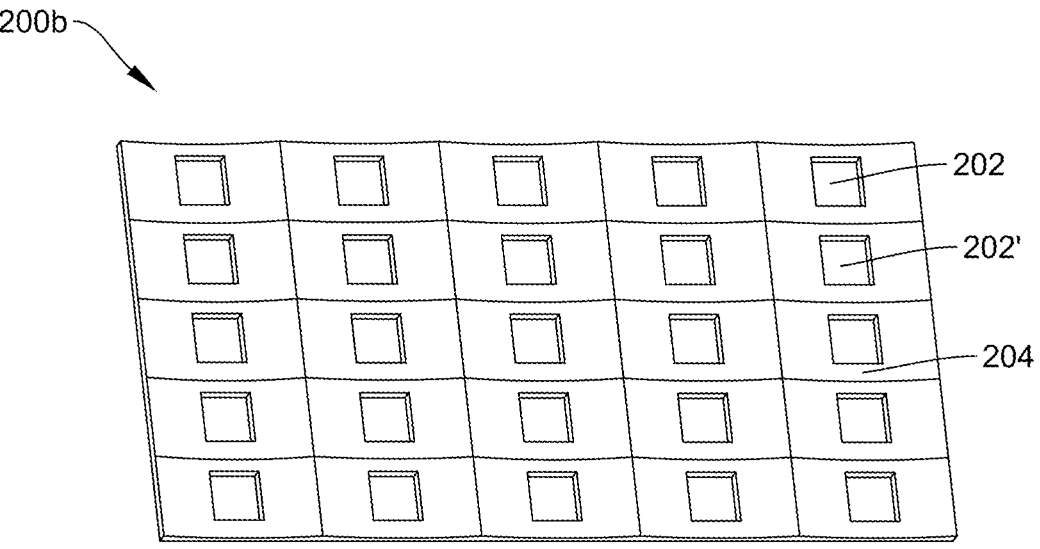
FIG. 2B shows a reflective sheet according to in accordance with another preferred embodiment.

As shown in FIG. 2A is a reflective sheet 200*a* in accordance with a preferred embodiment. The reflective sheet 200*a* comprises a plurality of punch-holes 202, 202'. Preferably, plurality of punch-holes 202, 202' has an equilateral geometry. Example of an equilateral geometry shape may be a hexagon, a pentagon or a square. The punch-holes 202, 202' may be circular as shown in FIG. 2A, or in an alternative embodiment as shown in FIG. 2B, the punch-holes 202, 202' is a square.

Preferably, the outer dimension shall fall within a range of 3 mm by 3 mm to 5 mm by 5 mm, while the inner dimension of the punch-hole may be between 1.6 mm by 1.6 mm to 2 mm by 2 mm to achieve optimum results. In an exemplary embodiment, the reflective sheet has a dimension of 40 mm by 40 mm and each single unit of the punch-hole 202 as shown in FIG. 2B has an outer dimension of 4 mm by 4 mm, while the inner dimension of the punch-hole is 1.64 mm by 1.64 mm. Advantageously, the aforesaid configuration optimizes the receiving of polarized light beam 116 and generating of light beams from the light generator 106 to achieve homogeneity. The above description provides an exemplary embodiment of this disclosure to optimize the results of achieve an optical illumination module which provides homogenous illumination to a motor vehicle display to counter the effects of wide-angle distribution. Nonetheless, it shall be understood by a skilled practitioner, the dimensions of the reflective sheet are non-limiting to the inventive concept of this disclosure.

In an exemplary embodiment, the reflective sheet 200*a* has an aspherical surface. The advantage of an aspherical surface controls the direction of light beams generated by the light generator, such that imaging quality is improved. This advantage is of particular importance to the automotive industry, where displaying of clear images for vehicular or warning information is desired. Examples of aspherical surface may include a concave or a bow-shape surface. Nonetheless, a non-aspherical surface may also achieve a less optimum result, without departing from the scope and spirit of this disclosure.

In an exemplary embodiment, the reflective sheet 200*a* may be a metal punch sheet fabricated from metal sheet punching process. In another exemplary embodiment, the reflective sheet 200*a* is a plastic sheet treated with a reflective coating. In yet another embodiment, the reflective sheet 200*a* is a plastic sheet treated with reflective foil.

In various embodiments discussed herein, the optical illumination module 100 function as a backlight unit to provide illumination to a viewing range (B) defined by a display layer 108, as shown in FIG. 1A and FIG. 1B. An example of a suitable display layer 108 may be a thin film transistor (TFT) display layer.

Figure 2C:
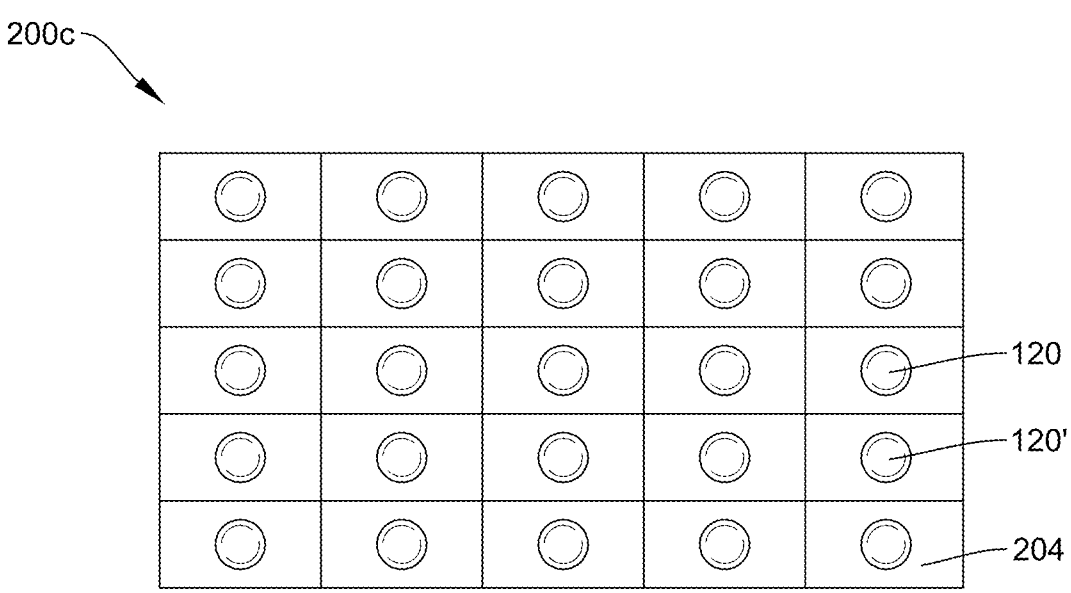
FIG. 2C shows a top view of a reflective sheet integrated with a lens array in accordance with a preferred embodiment.
Figure 2D:
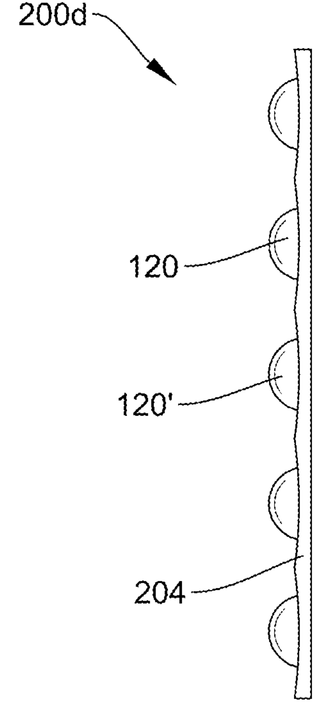
FIG. 2D shows a side view of a reflective sheet integrated with a lens array in accordance with a preferred embodiment.
Figure 2E:
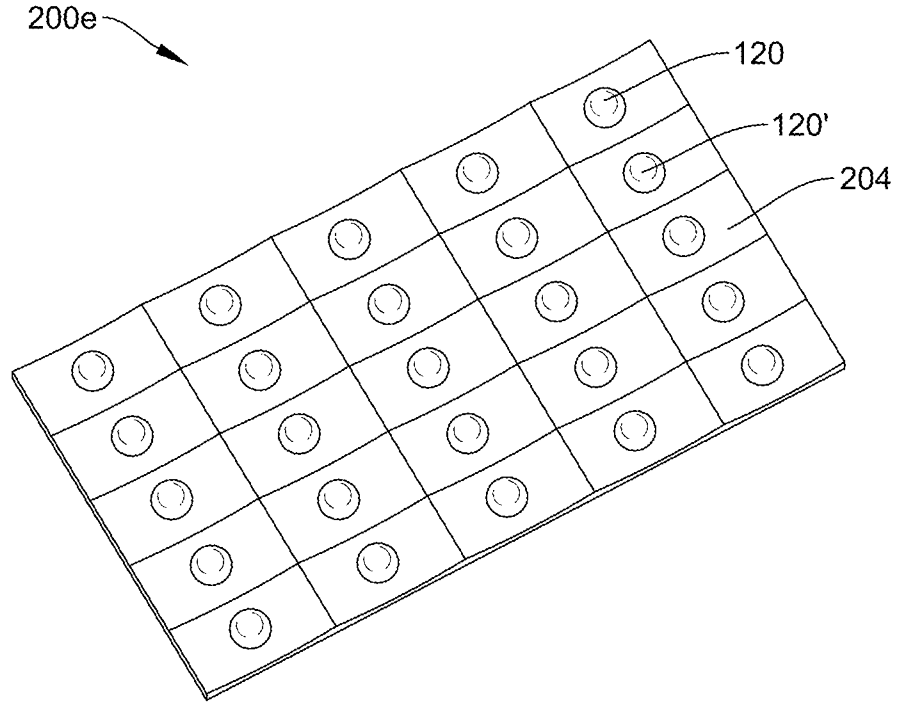
FIG. 2E shows a perspective view of a reflective sheet integrated with a lens array in accordance with a preferred embodiment.

In an exemplary embodiment, the reflective sheet 200*a* is positioned forward of the lens array 120 and the LED array or light generator 106 as shown in FIG. 1A. In another exemplary embodiment as shown in and FIG. 1B, the reflective sheet 200*a* is provided as a single device or an integrated reflective sheet 200*c* such as that as shown in FIG. 2C showing top view of an integrated reflective sheet 200*c*. FIG. 2D shows a side view of an integrated reflective sheet 200*d* where a lens array is integrated with the reflective sheet 104, 104'. In yet another exemplary embodiment, the reflective sheet 200*a* is provided as a single device such as that shown in FIG. 2C and FIG. 2D, of which individual lenses is integrated with each of the punch-holes 202, 202' of the reflective sheet 200*a*, to achieve the collimation effect from the lenses, combined with control of reflecting and re-directing characteristics of the reflective sheet 200*a*, by providing a single device. FIG. 2E shows a perspective view of an exemplary embodiment of the reflective sheet 200*a* integrated with lens array.

Figure 3A:
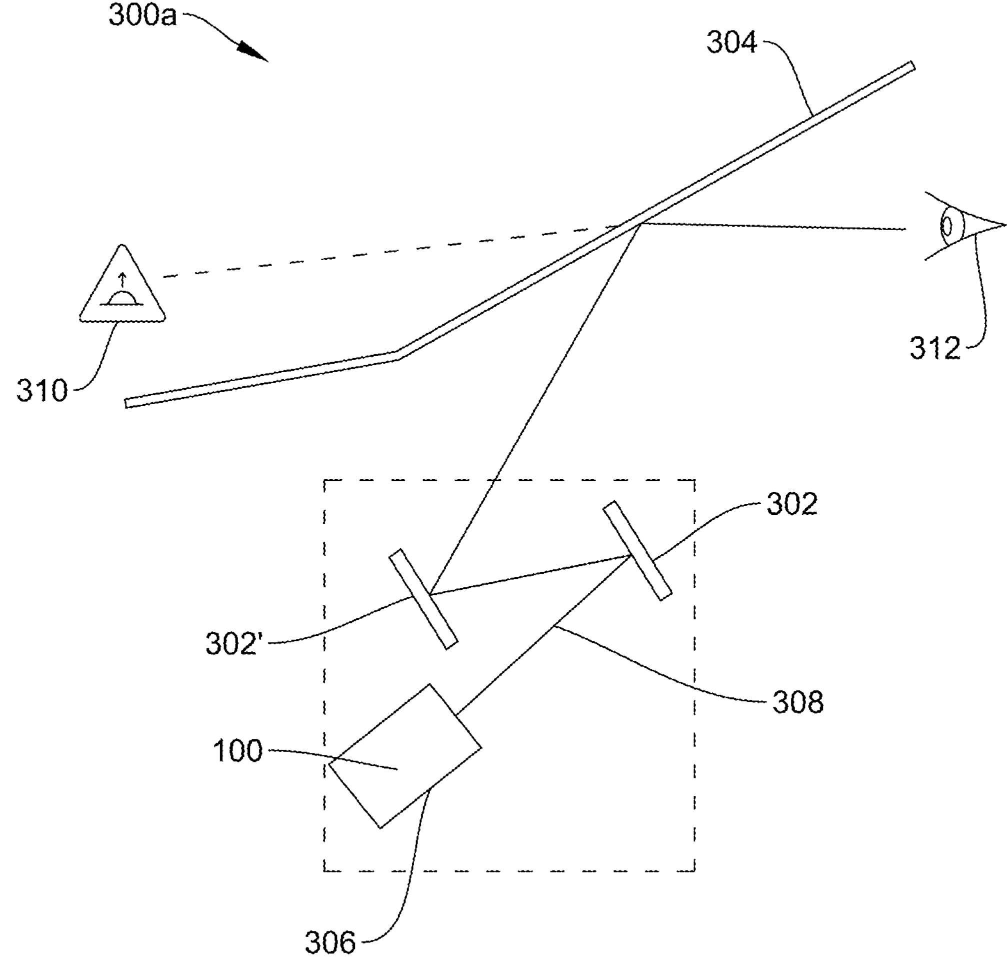
FIG. 3A illustrates a schematic diagram of a system using an optical illumination module in a motor vehicle display system in accordance with a preferred embodiment.

Turning now to FIG. 3A which illustrates a schematic diagram of system 300 using an optical illumination module 100 in a motor vehicle, system 300 represents a head-up display (HUD) system comprising reflectors 302, 302' and an image generating unit 306. In this exemplary embodiment, the optical illumination module 100 may be placed within the image generating unit 306. Image generated from the image generating unit 306 will be reflected on to a transparent pane 304 of a motor vehicle through reflectors 302, 302', forming a virtual image 310 that can be viewed by a viewer 312. Example of a transparent pane 304 may be a glass pane or a tempered glass pane that may be use as motor vehicle windows, motor vehicle sunroof and/or front and rear of motor vehicle windshield.

Figure 3B:
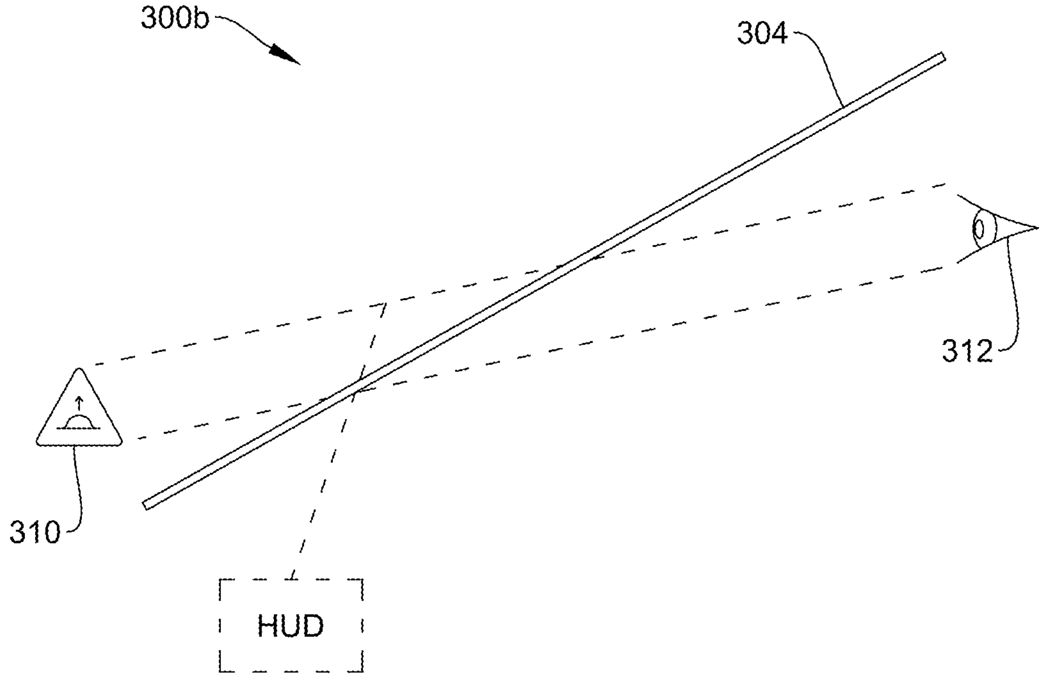
FIG. 3B illustrates a schematic diagram of a system using an optical illumination module in a motor vehicle display system in accordance with another preferred embodiment.

In another exemplary embodiment as shown in FIG. 3B illustrating another exemplary embodiment of HUD system 300*b*, for a type of head-up display which does not require additional mirrors or reflectors to reflect light beams from an image generating unit, but only project a virtual image 310 from the HUD system onto a transparent pane that can be directly observed by the driver 312.

Figure 4:
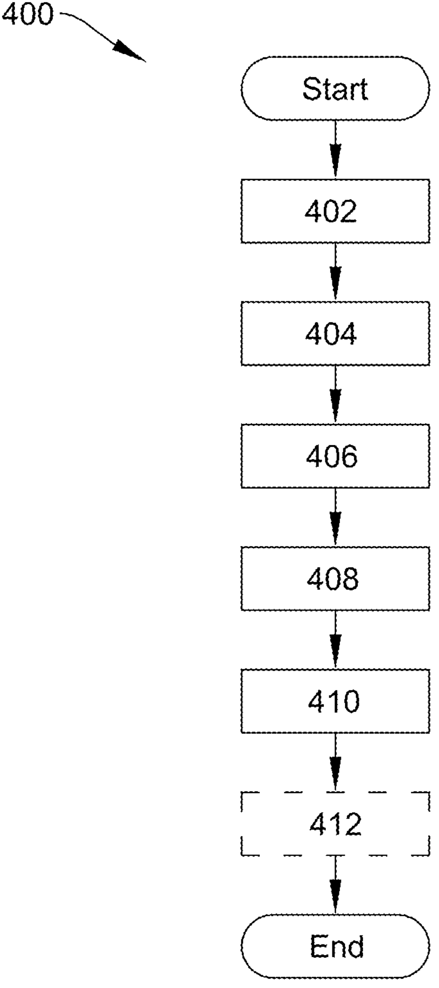
FIG. 4 illustrates a flowchart for providing an optical illumination in accordance with a preferred embodiment.

FIG. 4 illustrate a flowchart 400 for providing illumination for a display system comprising an optical illumination module 104, 104', 200*a*-200*e* as disclosed. In 402, a light generator generates light beams from the light generator. The light generator comprising a plurality of light cells. In the next step 404, the light beams generated form the light generator is at least partially polarized by way of a polarizer film. In 406, the light beams change a direction by way of a polarization-rotating element. In the next step 408, a reflective sheet receives the at least partially polarizing light beams and the light beams re-directed by the polarizing-rotating element, by way of a reflective sheet. In the next step 410, the light beams received by the reflective sheet, i.e. the at least partially polarized light beams and the light beams re-directed by the polarization-rotating element are re-directed together with light beams emitting from the light cells of the light generator towards the polarizer film.

In a further optional step 412, the method further comprises a step of locally dimming each light cell by controlling the contrast of light generated from each light cell.

Thus, it can be seen that an optical illumination module having a homogeneity level of illumination suitable for small viewing range applications, in particular motor vehicle display applications been provided. Due to the small beam angle of reflection, the polarized light beam is re-distributed within the optical illumination module to achieve uniform illumination or homogeneity. Further, the design of the reflective sheet controls the re-distribution of light beams and improves image quality by yielding clearer images compared to conventional direct-lit backlight units known in the art.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in the exemplary embodiment without departing from the scope of the invention as set forth in the appended claims.

The invention claimed is:

1. An optical illumination module for a display system comprising:

a light generator operable to generate light beams, the light generator comprising a plurality of light cells;

a polarizer film operable to at least partially polarize the generated light beams;

a reflective sheet having a convex spherical surface or a convex aspherical surface comprising a plurality of punch-holes configured to allow the generated light beams to emit therethrough; and a polarization-rotating element operable to re-direct the generated light beams;

wherein the reflective sheet is operable to receive the polarized light beams and the re-directed light beams and re-direct the polarized light beams, the re-directed light beams, and the light beams emitting through the punch-holes towards the polarizer film.

2. The optical illumination module of claim 1, wherein the reflective sheet is positioned between the light generator and the polarizer film.

3. The optical illumination module of claim 2, wherein the light generator comprises an LED array, a lens array or a combination thereof.

4. The optical illumination module of claim 3, wherein the lens array is positioned between the reflective sheet and the LED array.

5. The optical illumination module of claim 3, wherein the reflective sheet and the lens array are integrated as a single device.

6. The optical illumination module of claim 1, wherein the aspherical surface is a bow-shaped profile.

7. The optical illumination module of claim 6, wherein the reflective sheet is a metal punch-sheet, a plastic sheet treated with a reflective coating, or a plastic sheet treated with a reflective foil.

8. The optical illumination module of claim 7, wherein the polarizer film is a dual brightness enhancement film.

9. The optical illumination module of claim 8, wherein the polarization rotating element is a retarder or a quarter-wave plate.

10. The optical illumination module of claim 9, wherein the polarization rotating element is made of high birefringence material.

11. The optical illumination module of claim 10, further comprising an optical diffusor positioned forward of the polarizer film.

12. The optical illumination module of claim 11, wherein the display system is a motor vehicle display system operable to project a virtual image on a transparent pane.

13. The optical illumination module of claim 11, wherein the display system is a motor vehicle display system embedded within a display device.

14. A method of providing illumination for a display system, the method comprising:

generating light beams from a light generator, the light generator comprising a plurality of light cells;

at least partially polarizing light beams generated from the light generator by way of a polarizer film;

changing a direction of the light beams generated by the light generator by way of a polarization-rotating element;

receiving, by way of a reflective sheet: the at least partially polarized light beams reflected from the polarizer film and the light beams re-directed by the polarization-rotating element; and a reflective sheet comprising a convex spherical surface or a convex aspherical surface having a plurality of punch-holes configured to allow the generated light beams to emit therethrough re-directing, the at least partially polarized light beams, the light beams re-directed by the polarization-rotating element, and light beams emitting through the light cells towards the polarizer film.

15. The method of claim 14, further comprising locally dimming each light cell by controlling the contrast of light generated from each light cell.

* * * * *